United States Patent

[11] 3,609,216

[72] Inventor Albert R. Copp
    Hudson, Mass.
[21] Appl. No. 50,029
[22] Filed June 26, 1970
[45] Patented Sept. 28, 1971
[73] Assignee Surprenant, Inc.
    Jaffrey, N.H.

[54] TWISTED CABLE
    5 Claims, 2 Drawing Figs.
[52] U.S. Cl. ........................................ 174/113 R,
    174/36, 174/107, 174/117 FF
[51] Int. Cl. ........................................ H01b 7/00,
    H01b 7/08
[50] Field of Search ........................................ 174/113 R,
    115, 117 R, 117 F, 117 FF, 117 M, 102 R, 107, 36

[56] References Cited
    UNITED STATES PATENTS

| | | | |
|---|---|---|---|
| 2,155,060 | 4/1939 | Phillips .......................... | 174/113 |
| 1,987,442 | 1/1935 | Harris ............................ | 174/113 X |
| 2,004,612 | 6/1935 | Massingham ................ | 174/113 X |

*Primary Examiner*—Lewis H. Myers
*Assistant Examiner*—A. T. Grimley
*Attorney*—Cesari & McKenna

ABSTRACT: A cable comprises a twisted flat cable and an outer retaining jacket. If a portion of the jacket is removed at the end of the cable, the cable can be readily flattened to facilitate connection procedures.

PATENTED SEP 28 1971    3,609,216

INVENTOR
ALBERT R. COPP

BY *Cesari and McKenna*

ATTORNEY

TWISTED CABLE

BACKGROUND OF THE INVENTION

This invention generally relates to conductors and more specifically to cables formed of plural conductors.

Prior cables comprise electrical, optical or hydraulic conductors which are bundled or tied into circular cables or which are woven or bonded into flat cables. Both circular and flat cables have certain advantages which are most readily appreciated by considering electrical applications.

Circular cables formed by tying individual electrical conductors together provide a greater volumetric conductor density than flat cables. These cables are more easily electrically insulated, covered to increase abrasion resistance and shielded to improve cable noise characteristics. However, each conductor is usually randomly located in the cable and must be color coded or otherwise positively identified. Cables with randomly located conductors tend to be relatively inflexible and difficult to route in an electrical chassis. Although flexibility can be obtained by specially configuring the conductors, this process increases manufacturing cost. Whenever an individual conductor and a device are connected, the conductor must be stripped and cut manually because automatic conductor stripping and cutting techniques cannot be applied to circular cables.

Flat cables, on the other hand, have constant conductor location and can be connected to devices by using automatic stripping and cutting. However, they are characterized by a reduced volumetric density. Abrasion resistance characteristics are most difficult to obtain with flat cables than with circular cables. Shielding is also more difficult and is usually limited to individual conductors in the cable.

In prior applications, the selection of a flat or circular cable requires a compromise and the acceptance of some disadvantages to obtain certain advantages. If maintaining conductor location in the cable, identification and termination are paramount considerations, flat cables are selected even though the volumetric density and abrasion resistance are reduced. Where abrasion resistance and shielding are more important, circular cables are selected and the requirements for individually stripping and cutting conductors are accepted.

Therefore, it is an object of this invention to provide a cable comprising a plurality of conductors incorporating the advantages of both circular and flat cables.

SUMMARY

In accordance with my invention, a circular cable comprises a twisted flat cable. A jacket retains the cable in its circular form with one selvage of the flat cable at the center of the circular cable and the other selvage at the periphery.

To connect the cable to a device, the user removes a portion of the jacket. The cable portion coextensive with the removed jacket tends to return to its original flat configuration so that the cable provides advantages of both circular and flat cables.

This invention is pointed out with particularity in the appended claims. The above and further objects, features and advantages of this invention may be understood by referring to the following detailed description of cable formed in accordance with my invention taken in conjunction with the accompanying drawings.

DESCRIPTION OF AN ILLUSTRATIVE EMBODIMENT

My invention pertains to electrical, optical and hydraulic conductors even though the following discussion describes an electrical cable. In accordance with the invention, a flat cable feeding unit twists a flat cable helically along a longitudinal axis. A jacket retains the twisted flat cable in a circular cross section. This configuration has special advantages over the obvious approach of merely rolling the flat cable. A circular cable might be formed by rolling an entire flat cable simultaneously about a longitudinal axis, but it will have poor flexibility and be more difficult to manufacture than the helically wound cables.

Figure 1:
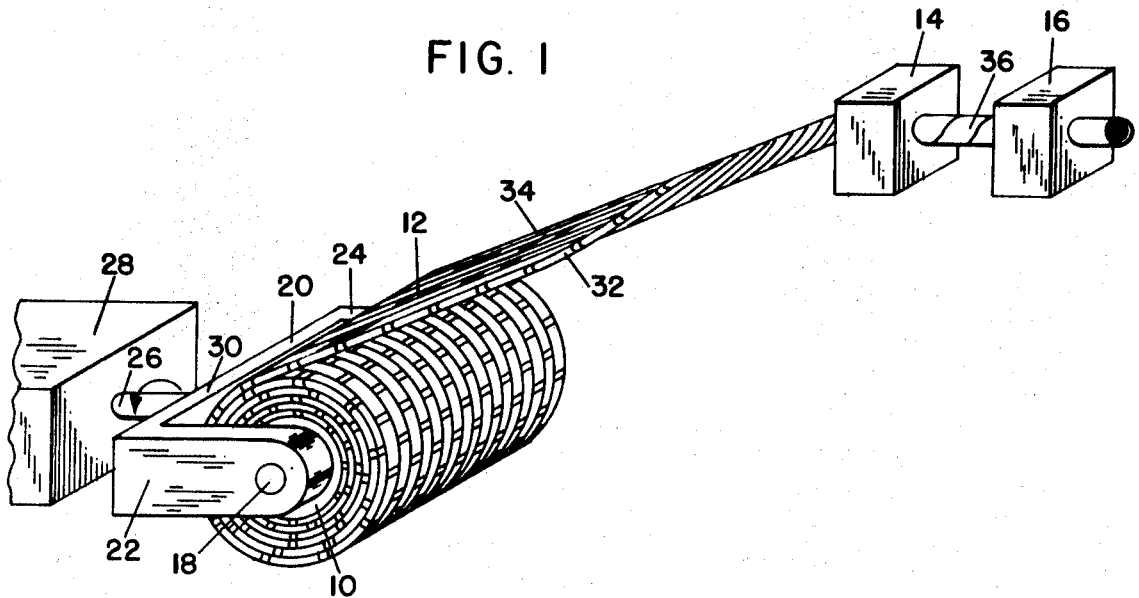
FIG. 1 schematically depicts the process for forming a cable in accordance with my invention.

Bonded and woven flat cables are available commercially, and either cable can be used although woven cables are preferably for reasons described later. Cable manufacturers usually store flat cable on a cylindrical spool 10 for storing flat cable 12 shown in FIG. 1. Converting the flat cable to circular cable includes at least one operation performed at one work station. FIG. 1 illustrates two representative work stations 14 and 16 for performing two operations.

A shaft 18 carries the spool 10. The cable may be kept under tension as it leaves the support 10. A cradle 20 with arms 22 and 24 supports the shaft 18 while a drive shaft 26 from a drive unit 28 supports a base member 30 of the cradle 20. As the work station 14 pulls cable 12 from the spool 10, the drive unit 28 continuously rotates the cradle 20 about the axis of the drive shaft 26. This cradle rotation twists the flat cable 12 into a spiral with one selvage 32 at the center and the other selvage 34 at the outside of the resulting circular cable.

The pitch of the resulting spiral depends upon the relative rates at which the drive unit 28 turns the cradle 20 and the rate at which the cable 12 feeds to the first work station 14. Cable pitch varies with different cables and is easily determined experimentally. Basically, the pitch must be less than that which causes the twisted cable to twist about itself or buckle. However, the pitch should be great enough to tightly twist the flat cable.

The primary function of the work stations is to apply a retainer around the twisted cable. Several processes are appropriate. In one process, the work station 14 winds an organic polymer dielectric tape around the twisted cable. The tape is preferably of a thermosetting material so as not to soften or bond to the insulation on the individual conductors during succeeding process steps. Suitable tape materials include thermosetting polyester and thermosetting polyimide films. A wrapped cable 36 from the work station 14 transfers to the work station 16 which extrudes a thermoplastic jacket onto the wrapped cable 36 by a conventional process. Thermoplastic materials suitable for the jacket include polyvinyl chloride, polyethylene, and polyurethane materials.

Other retaining jackets and processes for retaining the twisted cable are applicable. In fact, the retaining jacket can comprise materials for electrically shielding, electrically insulating or improving abrasion resistance, formed by a conventional process for jacketing round cables. A specific jacket may also include several insulating layers or combine shielding and insulating layers. The resulting circular cables still have improved volumetric density and insulation and abrasion characteristics.

As previously indicated, I prefer to manufacture twisted cables with woven flat cables as opposed to bonded cables. Woven flat cables improve the flexibility of the twisted cable because individual conductors can move freely with respect to the tape and also with respect to other conductors.

Figure 2:
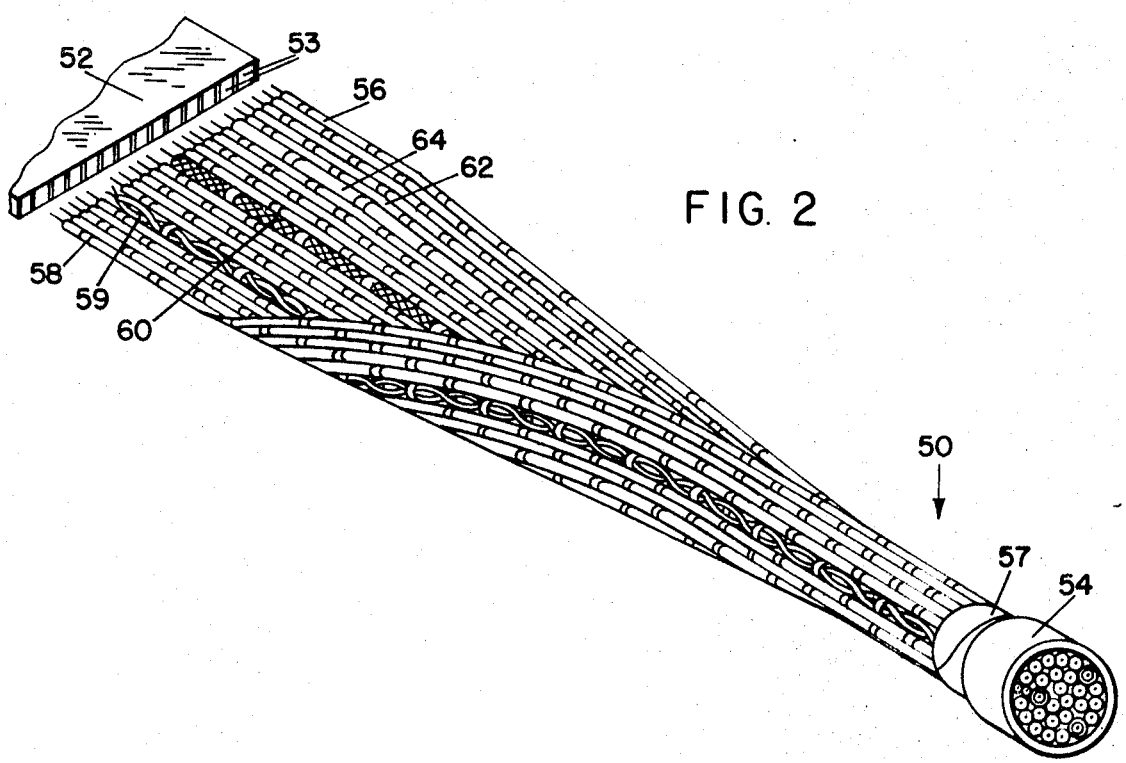
FIG. 2 illustrates a cable formed in accordance with my invention.

As previously indicated, prior circular cables have several disadvantages which my cable overcomes. FIG. 2 shows a terminated end 50 of a woven cable ready for insertion into a terminal block 52 with a plurality of contacts 53. Removing the retaining jacket 54 and the tape 57 permits the terminated end 50 to untwist so an end portion 56 flattens. Weft threads 58 in the flat woven cable locate each conductor and simplify identification. Known stripping equipment can automatically remove insulation and cut wires at the flattened end portion 56. Therefore, this cable incorporates the advantages of flat cables in connecting the cable to a device and the advantages of circular cable related to routing the cable.

Electrical cables must have certain impedance characteristics not required in optical or hydraulic cables. Impedance variations along a given conductor must be minimal. If the impedance varies over a wide range, special impedance matching networks may be required to connect a device from the cable. These networks must be specially built because the cable impedance at the connection cannot be determined until the cable is cut. Impedance variations and especially impedance discontinuities also tend to degrade the transmitted signal and increase crosstalk among the conductors. Cable manufacturers usually construct cables with special configurations to obtain desirable impedance characteristics; and any electrical cable must have these characteristics.

One might expect that the twisted configuration of my cable would not provide these characteristics. In fact, tests show that my cable has acceptable impedance characteristics. In accordance with these tests, a pulse is transmitted down a conductor and the reflected voltage is measured to indicate the positions of variations and/or discontinuities with respect to a time scale representing conductor length. These tests show that impedance variations on the twisted cable are limited to a narrow range. The range permits the use of standard matching circuits to interconnect the cable with other devices.

Circular cables constructed in accordance with my invention can comprise different types of conductors. For example, the cable in FIG. 2 includes a twisted pair of conductors 59, a shielded conductor 60 and two conductors 62 and 64 which have different sizes. Furthermore, a single cable can comprise any combination of electrical, optical or hydraulic conductors.

In summary, I provide a cable which, in the preferred embodiment, comprises a flat woven cable twisted into helical form and an outer retaining jacket. The circular cable provides high volumetric conductor density and cable flexibility to simplify routing the cable between devices and obviate disadvantages otherwise encountered with flat cables. However, at the ends, the disadvantages of circular cable are eliminated because the cable untwists into a flattened configuration when the retaining jacket is removed. This simplifies the termination procedures. It is obvious that many variations and modifications can be made to cables. Therefore, it is the object of the appended claims to cover all such variations and modifications as come within the true spirit and scope of this invention.

What I claim as new and desire to secure by Letters Patent of the U.S. is:

1. A cable assembly comprising:
   A. a woven cable with warp conductors and weft material, said cable having first and second selvages and being spirally twisted around said first selvage,
   B. an outer retainer for maintaining said cable in its twisted configuration whereby said cable tends to flatten when said retainer is removed.

2. A cable as recited in claim 1 wherein said flat cable is twisted helically along an axis.

3. A cable as recited in claim 1 wherein said first selvage lies substantially along the axis of the cable and said second selvage lies at the outer periphery.

4. A cable as recited in claim 1 wherein said retainer comprises an intermediate tape contiguous to said cable and an outer layer contiguous with said intermediate tape.

5. A cable as recited in claim 1 wherein said conductors are electrically conducting and said retainer includes means for shielding said cable.